United States Patent

Kish et al.

[15] 3,697,963

[45] Oct. 10, 1972

[54] SINGLE WALL DOMAIN MEMORY ORGANIZATION

[72] Inventors: Donald Eugene Kish, North Plainfield; James Lanson Smith, Bedminster, both of N.J.

[73] Assignee: Bell Telephone Laboratories, Incorporated, Murray Hill, N.J.

[22] Filed: March 29, 1971

[21] Appl. No.: 128,889

[52] U.S. Cl....340/174 TF, 340/174 SR, 340/174 VA

[51] Int. Cl.........................G11c 21/00, G11c 11/14

[58] Field of Search.................................340/174 TF

[56] References Cited

UNITED STATES PATENTS 3,613,056 12/1971 Bobeck et al........340/174 TF 3,619,636 11/1971 Chow..................340/174 TF

*Primary Examiner*—James W. Moffitt
*Attorney*—R. J. Guenther and Kenneth B. Hamlin

[57] ABSTRACT

The transfer of single wall domains between propagation channels defined in "field access" arrangements by magnetically soft elements adjacent a layer in which the domains can be moved is achieved by a hybrid arrangement of magnetically soft guide elements and a conductor which effects lateral displacement of domains in pairs between fixed positions defined by the guide elements consistent with positions which are part of the channels involved in the transfer.

9 Claims, 13 Drawing Figures

INVENTORS D. E. KISH
J. L. SMITH
BY Herbert M. Shapiro
ATTORNEY

FIG. 6
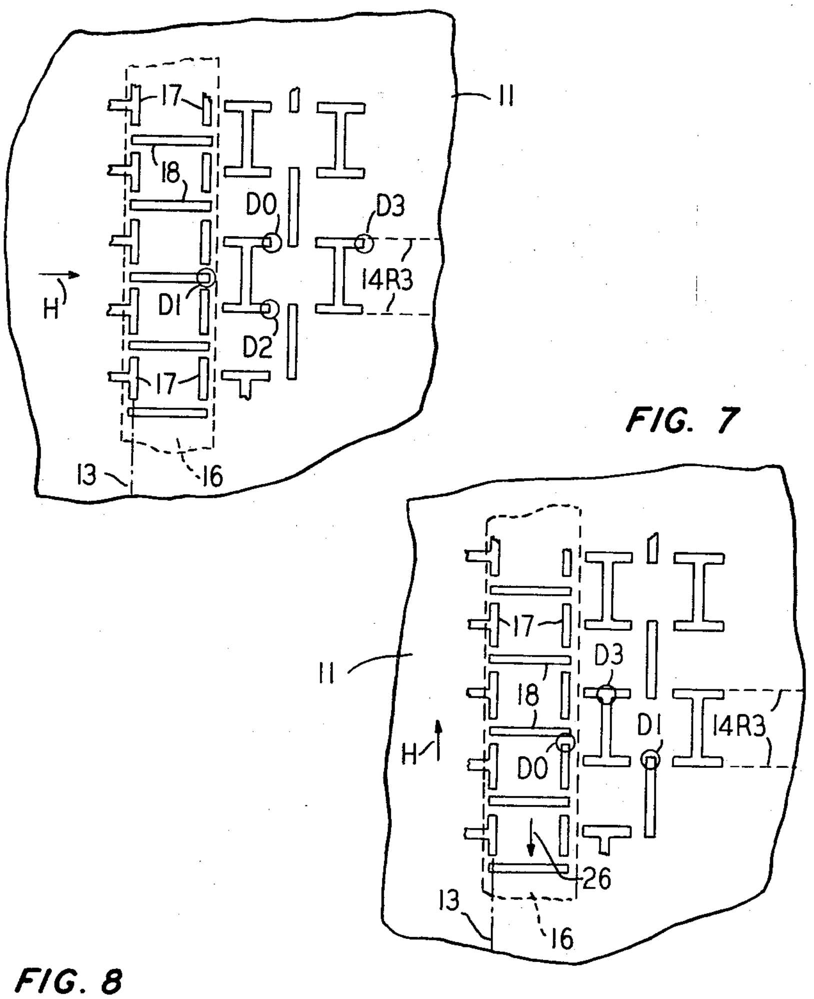
FIG. 6, FIG. 7
FIG. 8
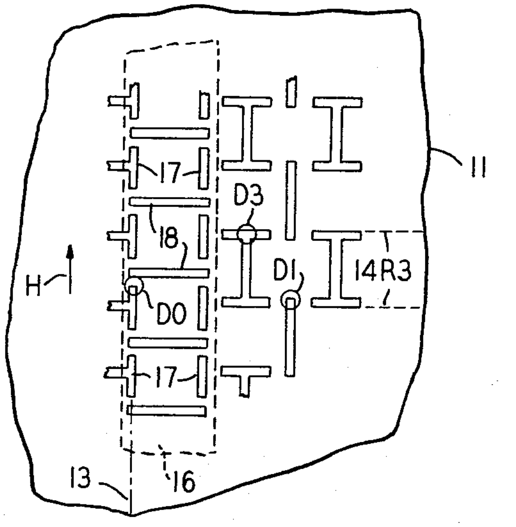

FIG. 9
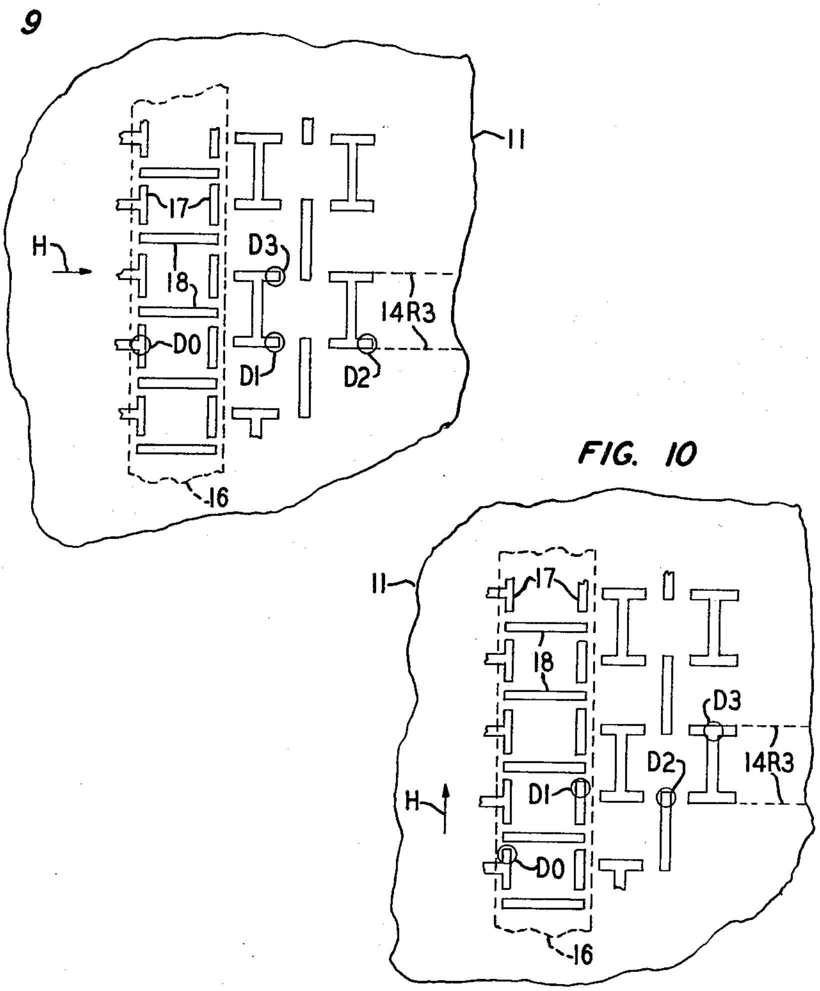
FIG. 9, FIG. 10
FIG. 11
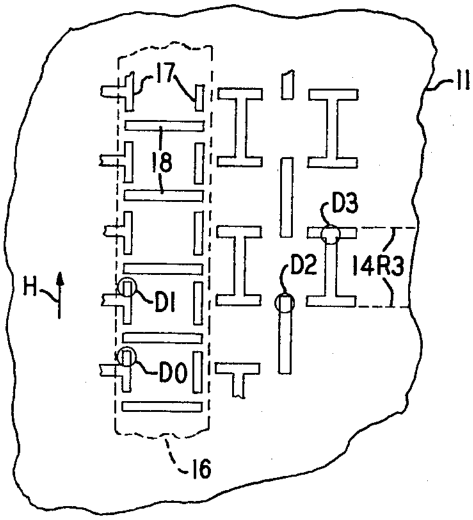

SINGLE WALL DOMAIN MEMORY ORGANIZATION

FIELD OF THE INVENTION

This invention relates to data processing arrangements and more particularly to such arrangements in which information is represented by patterns of single wall domains.

BACKGROUND OF THE INVENTION

A single wall domain is a reverse magnetized domain encompassed by a single domain wall which closes on itself in the plane of a slice or layer of material in which it is moved. Typically, materials in which such domains are moved are characterized by a preferred direction of magnetization nominally normal to the plane of the slice. Domains of this type can be observed, via the familiar Faraday effect, with polarized light. The domains appear as circles or disks under a microscope and are frequently referred to as "bubbles."

U.S. Pat. No. 3,534,347 of A. H. Bobeck issued Oct. 13, 1970 describes one mode of moving single wall domains in a suitable layer of magnetic material this mode is usually referred to as the "field access" mode and involves a magnetic field reorienting in the plane of the layer. Magnetically soft overlay elements are disposed adjacent the surface of the layer in a pattern which exhibits changing pole patterns which move domains to consecutively displaced positions as the in-plane field reorients. In the most familiar arrangement of this type, an overlay pattern of T-and-bar-shaped elements respond to a rotating in-plane field to generate a changing pole pattern to displace domains along a linear path in the layer. Grooves in the surface of the layer in which domains can be moved may be employed instead of the magnetically soft material to achieve domain displacement.

Field access arrangements are particularly attractive because, as the name implies, access to the layer is by virtue of the field and no external lead connections are necessary. In addition, extremely high packing densities can be achieved.

In order to realize short access times in such field access arrangements, the magnetically soft elements are organized to form closed loop propagation channels which are oriented parallel to one dimension of the layer (viz. horizontal loops) and a single closed loop channel which is oriented vertically with respect to that dimension. A single detector arrangement coupled to the vertical channel is sufficient to detect all information so long as the information can be transferred controllably from the horizontal to the vertical channels.

Arrangements of this type can be organized to produce a number of useful devices. In one arrangement, for example, of the type disclosed in U.S. Pat. No. 3,508,225 of J. L. Smith issued Apr. 21, 1970, each horizontal loop stores an information word representing a telephone number, for example. A particular telephone number is selected for movement into the vertical channel by closing a gate which allows the stored information to advance into the vertical loop as the in-plane field rotates. This organization requires a separate access lead and conductor for each horizontal loop and, accordingly, is most practical for apparatus such as a repertory dialer in which relatively few telephone numbers are stored.

On the other hand, if large amounts of information are to be stored, it is desirable to have fewer than one access lead and conductor for each horizontal channel. In order to achieve this result, information is organized so that the bits of each word are stored in the like bit locations of all the horizontal loops. A single conductor may be used to gate all the bits of a word simultaneously into the vertical loop when the information is so organized.

But due to minimum spacings required between adjacent domains for propagation arrangements of this type, horizontal loops are spaced two bit locations (viz, two periods of the overlay pattern) apart when measured center to center. If an access conductor is pulsed to move simultaneously a single bit from each horizontal loop into a vertical loop, the bits are spaced two bit locations apart leading to a 50 percent decrease in access time. The movement of two consecutive bits from each horizontal loop into the vertical loop resolves this particular difficulty. Although the transfer of two bits in this manner requires two cycles of the in-plane field, no untoward effects occur even if a power failure should occur before the transfer to the vertical loop because information merely continues to recirculate in the appropriate horizontal loops. But, if a power failure should occur during the transfer of consecutive domains from the vertical loop to the originating horizontal loops, only a single domain may be properly transferred and the associated domains could be lost irretrievably because of the loss of information as to the correspondence between the bits in the vertical loop and the horizontal loops to which the bits are to be transferred.

BRIEF DESCRIPTION OF THE INVENTION

Horizontal and vertical domain propagation loops of the type described above are defined for the movement of domains in a layer in which single wall domains can be moved by magnetically soft elements adjacent the surface of the layer. The elements are disposed to recirculate domain patterns within the loops in response to a rotating in-plane magnetic field. The horizontal and vertical loops come into proximity to each other in an area also coupled by an electrical conductor which moves domain patterns laterally thereacross when the conductor is pulsed. Magnetically soft guide elements function as part of the lateral displacement arrangement to move domains in pairs from one side of the conductor to the other between fixed positions from which further movement of the domain pairs is ensured by the loop defining elements in response to the in-plane field.

Not only is a relatively high access time ensured but loss of information due to power failure during loop transfer operations is avoided.

BRIEF DESCRIPTION OF THE DRAWING

FIGS. 2 through 11 are schematic illustrations of a portion of the domain arrangement of FIG. 1.

DETAILED DESCRIPTION

Figure 1:
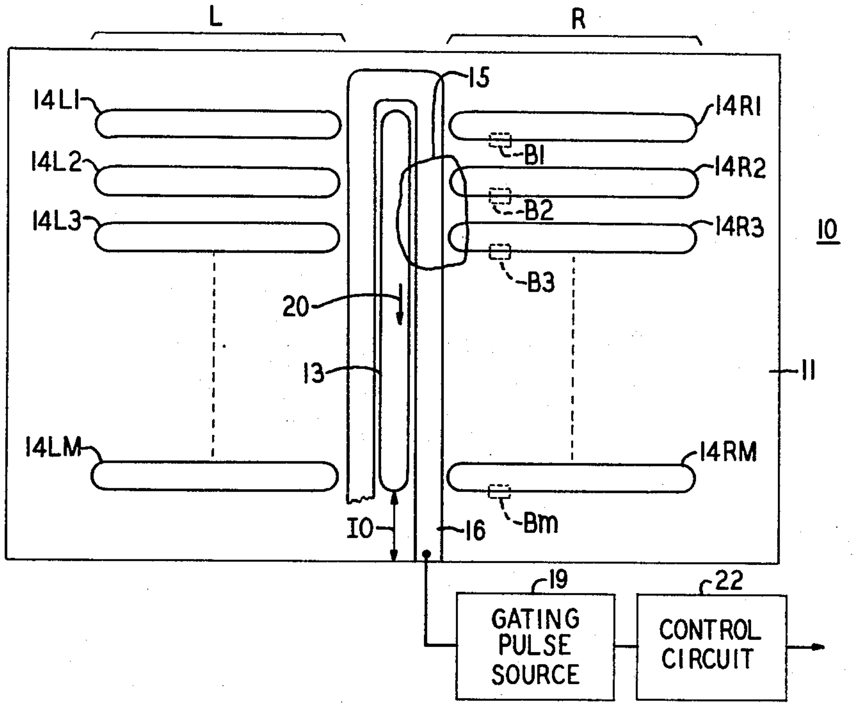
FIG. 1 is a schematic illustration of a domain arrangement in accordance with this invention.

FIG. 1 shows a repertory dialer memory arrangement 10 in accordance with this invention. The arrangement comprises a layer 11 of magnetic material in which single wall domains can be moved.

The illustrative mode of domain movement in layer 11 is implemented by the above-mentioned field access technique using magnetically soft elements adjacent the surface of layer 11. The elements are illustratively of T-and-bar shaped geometry disposed to respond to a magnetic field rotating clockwise in the plane of layer 11. The function of the overlay pattern is represented in line diagram form in FIG. 1 and the pattern itself is shown in some detail in FIG. 2.

The overlay pattern may be formed by familiar photolithographic techniques on glass which is then abutted against the surface of layer 11 or may be formed directly on the surface of layer 11. In the latter instance, a spacing layer of, for example, Chromium or Silicon oxide is employed to separate the pattern from layer 11 in order to avoid exchange coupling effects which hinder domain movement. Spacings of about one to two thousand angstroms have been found suitable and appropriate spacings are approximately one-fortieth the period of the overlay pattern or about one-eighth the diameter of the domain moved. The spacing cannot be too large or the overlay elements will be too remote to produce domain movement in response to the in-plane field.

The overall organization of an arrangement in accordance with the invention is depicted in FIG. 1 by the horizontal and vertical closed loop line indications. There is a single vertical closed loop 13 about which domain patterns move in a clockwise direction in response to a clockwise rotating in-plane field as will become clear. The figure also shows two banks R and L of horizontal closed loops 14R1, 14R2 through 14RM and 14L1, 14L2 through 14LM to the right and left of loop 13, respectively, as viewed in FIG. 1. Domains move clockwise in each of the horizontal loops. A binary word is represented by the bits in the like positions of the horizontal loops in a bank of loops as is represented by the broken blocks B1, B2 through B*m* in FIG. 1 or by the bits in like position of all the horizontal loops of both banks of loops. For simplicity, only the bits of the right bank are considered.

Figure 2:
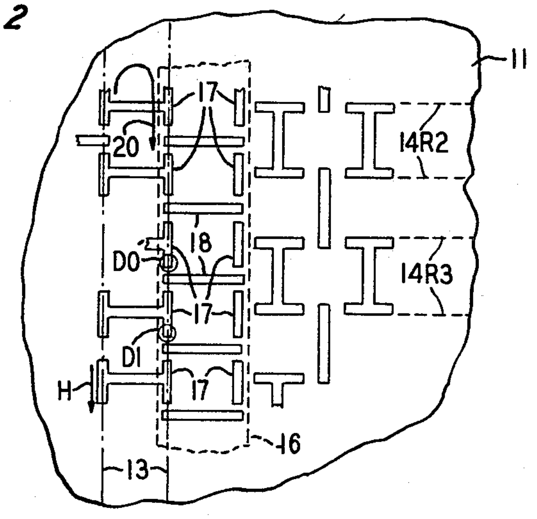

FIG. 2 shows a representative portion 15 of FIG. 1 where the transfer of domain patterns between the vertical loop and the horizontal loops occur. It is noted in FIG. 1 that a conductor 16 separates the line indications of the horizontal loops from the line indications of the vertical loop. FIG. 2 shows the overlay elements which define representative loops at the transfer positions in detail. The defining elements are seen to comprise bar and T-shaped patterns which appear as the I-shaped elements shown when the T-shaped elements of adjacent paths are close together. The pattern for loop 13 is identical to that of a horizontal loop as may be observed by rotating FIG. 2 90°.

The vertical elements 17, in FIG. 2, to the right and left side of conductor 16 (as viewed in FIG. 1) form integral parts of the horizontal loops and loop 13, respectively. It will be seen that domains are transferred in pairs from the vertical loop to each horizontal loop along guide elements 18 which also serve as integral parts of the vertical loop and the horizontal loop with which they are associated. First, the transfer of domains from the vertical to the horizontal loops is described. The transfer of domains from the horizontal loops to the vertical loops will be shown thereafter to occur either by consecutive transfer operations or in pairs during a single transfer operation.

To be specific, elements 18 will be seen to function in concert with electrical conductor 16 to generate pole patterns in response to pulses in conductor 16 to cause transfer of domain patterns from the vertical loop to the horizontal loops (and vice versa). Conductor 16 is connected between gating pulse source 19 of FIG. 1 and ground and is considered to lie between layer 11 and the magnetically soft elements for illustrative purposes. When conductor 16 is pulsed, a magnetic field is generated and the normal component of that field attracts domains to one edge of conductor 16 or the other depending on the polarity of the pulse. In addition, pole patterns are generated in elements 18 by the in-plane component of that field. The two field components act to move domain pairs representative of consecutive bits of a binary word from loop 13 to the horizontal loops of, for example, bank R. In this context, each broken block B1, B2 etc., of FIG. 1 can be understood to include two consecutive bits of a binary word.

Figures 3, 4, 5:
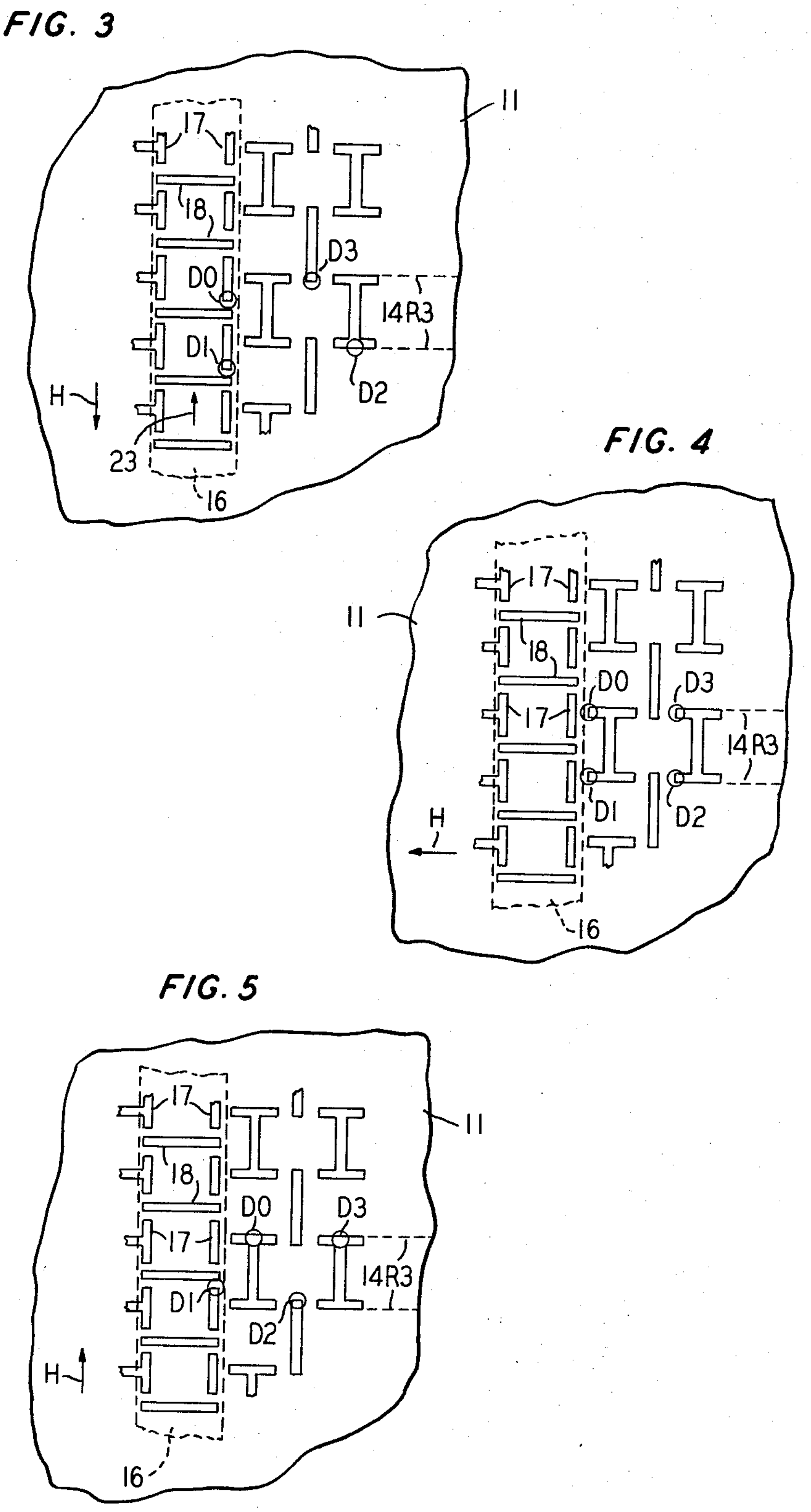

Consider the situation where the information represented by B1, B2 through B*m* of FIG. 1 is transferred between originating horizontal loops and vertical loop 13 where movement of domain patterns to an input-output position represented by the two-headed arrow IO in FIG. 1 occurs. The transfer operation is illustrated for domains DO and D1 moving clockwise in channel 13 as indicated by the arrow 20 in FIG. 2. The rotating in-plane field is oriented downward as indicated by the arrow H in this figure. While the in-plane field is so oriented, conductor 16 is pulsed by source 19 under the control of a control circuit 22 of FIG. 1 which also controls the in-plane field source (not shown). A current in the upward direction represented by arrow 23 in FIG. 3 is thus generated. Source 19 and circuit 22 may be any such element capable of operating in accordance with this invention and are consistent with the arrangement shown in copending application Ser. No. 875,338, filed Nov. 10, 1969 for P. I. Bonyhard, U. F. Gianola and A. J. Perneski now U.S. Pat. No. 3,618,054.

The current in conductor 16 generates a magnetic field in the plane of layer 11 directed from left to right as viewed in FIG. 3 to generate in elements 18 attracting poles to the right end thereof for moving domains DO and D1 to the positions shown in FIG. 3. In addition, the normal component of the field, so generated, provides attracting and repelling fields to the right and left sides thereof, respectively, causing domains to move to the right in a compatible manner. The guide elements function to define precisely the destination of the domains which destination is at the bottom of associated elements 17 due to the downward direction of the rotating field when transfer to the horizontal loops occurs. The in-plane field next reorients to the left as indicated by the arrow H in FIG. 4. Transfer is now complete and the transferred information occupies normal positions in loop 14R3. This is clear from a glance at FIGS. 5 and 6 which show the positions of the transferred domains in a stream of domains already in a horizontal loop when the in-plane field next reorients upward and then to the right as indicated by the arrow H there. Normal field access operation now occurs.

It is to be understood that the described operation occurs simultaneously in exactly the same manner in each of the horizontal loops with which conductor 16 is associated. That is, a like transfer of domains in pairs occurs in each of the horizontal loops of bank R as described due to the use of two guide elements for each horizontal loop as shown in FIGS. 2 and 3. As was stated hereinbefore, conductor 16 may be of a U-shaped geometry (as shown in FIG. 1) coupling both the right and left bank of loops. In this case, similar transfer of domains in pairs occurs for each horizontal loop of the right and left banks.

The operation to transfer information from the horizontal loops to the vertical loop 13 is quite similar to that described above and is illustrated for channel 14R3. FIG. 7 shows the domains DO and D1 of FIG. 6 moving clockwise in loop 14R3 and in positions for transfer to loop 13. The in-plane field is directed upward as was the case in FIG. 5 when transfer occurs in this instance. The arrow H in FIG. 7 represents this condition. At this juncture, conductor 16 is again pulsed to generate a current flowing in a direction opposite to that described above, a direction indicated by the arrow 26 in FIG. 7. Domain DO is transferred along the associated guide element to the top of the associated element 17 to the left side of conductor 16, as viewed in FIG. 8.

The in-plane field next reorients to the right as indicated by the arrow H in FIG. 9. Domains DO, D1, and D3 reposition as shown. The rotation of the in-plane field through the next three-quarters of a cycle results in domains DO, D1, and D3 occupying the positions shown in FIG. 10 for an upward field orientation represented by arrow H there. At this juncture, conductor 16 is again pulsed to transfer domain D1 as was domain DO transferred in FIG. 8. Continued rotation of the in-plane field moves domains DO and D1 clockwise along loop 13 while domains D3 and D2 move clockwise along loops 14R3. As before, this transfer operation is carried out simultaneously for all horizontal loops coupled by conductor 16.

It is to be understood that the domain representations are not necessarily to scale and are only intended to indicate domain positions. The dimension of the domains with respect to the magnetically soft elements are indicated hereinafter.

The input and output position for all information transferred as described above is at the bottom of loop 13 as indicated in FIG. 1 and suitable input and detection means for provision and detection of domains are well known in the art. Such elements are assumed present without further discussion and are only indicated herein by arrow IO of FIG. 1.

It should be clear that although information transfer is described herein in terms of the presence of domains, that in practice the presence and absence of domains represent binary ones and zeros. The absence of a domain in any position in the loops of FIG. 1 may be understood to be transferred as is a domain in the description above.

We have now demonstrated the simultaneous transfer of information between a single vertical loop or channel and a bank of horizontal loops in response to a pulsed conductor and the magnetic poles generated by the pulses in magnetically soft guide elements coupled to the conductor. The illustrative operation requires one such pulse to transfer two domains from the vertical loop to each horizontal loop simultaneously but requires two pulses, one in each of two consecutive rotations of the in-plane field to transfer domain pairs in the opposite direction (to the vertical loop).

Figure 12:
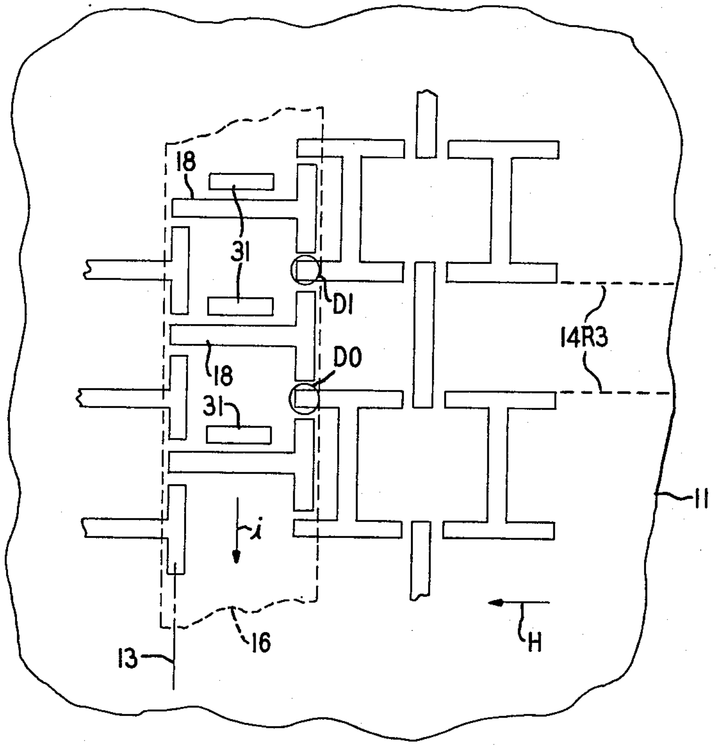
FIG. 12 and 13 are schematic illustrations of a portion of an alternative arrangement in accordance with this invention.

A second embodiment in accordance with this invention operates to transfer simultaneously domain pairs to or from the vertical loop of FIG. 1 with a single current pulse. FIG. 12 shows an arrangement of magnetically soft elements which are assumed disposed adjacent sheet 11 for this purpose. A comparison of FIG. 12 with, for example, FIG. 11 reveals a difference in the pattern of elements in the two figures. FIG. 12, for example, shows guide elements 31 adjacent associated elements 18 of FIG. 11 and a T-shaped geometry for elements 18. Operation is quite similar to that described above, the significant difference being in the transfer of domain patterns from the horizontal loops into the vertical loop in pairs as is mentioned above and the circulation of domain patterns in horizontal loops offset one period from the loops of FIG. 11.

The in-plane field is considered arbitrarily to be rotating counterclockwise resulting in a clockwise movement of domain patterns in the horizontal loops (14R3 in FIG. 12) as is consistent with the offset position of the loops with respect to the loops of the previous embodiment. Domains are shown moving (counterclockwise) upward in loop 13 along the left-hand edge of conductor 16 as viewed in FIG. 13 in accordance with well understood principles. Adjacent domains moving in loop 14R3 occupy the positions shown for domains DO and D1 in FIG. 12 when a transfer current in a downward direction indicated by arrow *i* is impressed in conductor 16. The in-plane field is directed to the left as indicated by the arrow H in FIG. 12 at this juncture. The domains move simultaneously to the position shown in FIG. 13. Of course, transfer occurs simultaneously at all horizontal loops, all the information thus transferred continuing to move counterclockwise in loop 13 in response to continued rotation of the in-plane field while information not so transferred continues to move clockwise in the various horizontal loops.

Figure 13:
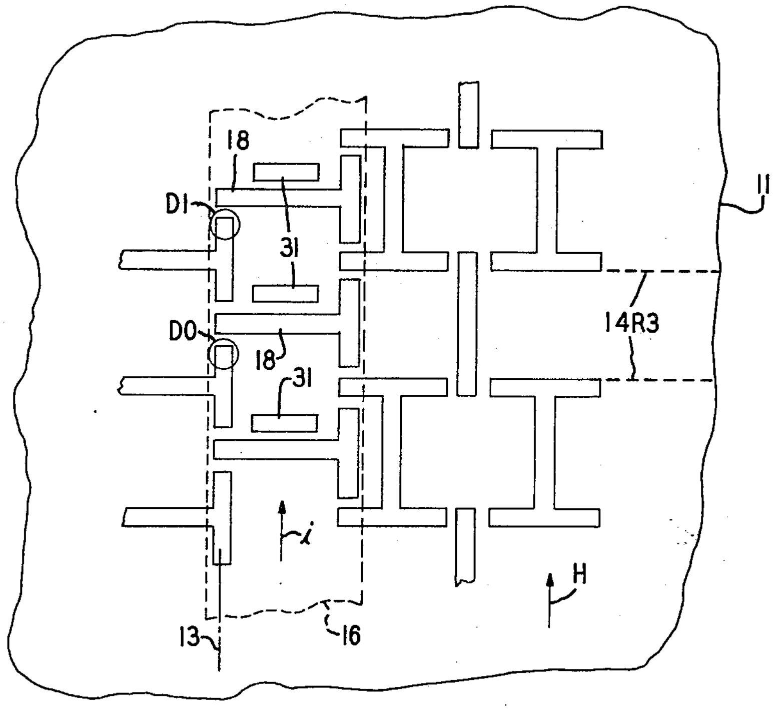

Transfer of domains from the positions shown in FIG. 13 to those shown in FIG. 12 is just the reverse of that just described, the pulse in conductor 16 occurring when the in-plane field is directed upward as viewed in FIG. 13.

The function of the guide elements 31 is to prevent domains from moving to improper positions during the transfer operation. For example, during transfer of domain D1 in FIG. 12, the domain "sees" a negative pole to the right of the element 31 associated with loop 14R3 as indicated by the minus sign there. The negative pole repels domains and insures that domain D1 is displaced upward as it moves to the left during the transfer operation. Similarly, when domain D1 is returned to its originating horizontal loop, it sees a strong negative pole to the left of that element 31 as indicated in FIG. 13. This condition insures that the domain is displaced downward as it moves to the right during transfer operation. The poles are generated by the in-plane component of the field produced by the transfer pulse in conductor 16.

It is to be recognized that access time, impedance, and back voltage parameters are increasingly smaller for increasingly shorter conductors 16. A straight line conductor accordingly provides the minimum values for these parameters. For straight line sections of domain propagation loops, which also lead to lower access speeds, all domains in the vertical loop are exposed to the transfer field during a transfer operation. Consequently, all domains are unavoidably moved by the transfer field. But since a fully occupied vertical loop includes, at a minimum, two domains for each horizontal channel, two domains must be transferred for each horizontal channel during each transfer operation. The provision of an implementation to carry out a domain pair transfer is essential unless a considerable loss in access speed is acceptable. Two guide elements spaced one bit location or overlay period apart for horizontal loops spaced two periods apart insure pair transfer in accordance with this invention. This will be more fully understood from a recitation hereinafter of the dimensions of an illustrative arrangement which will show the spacings between horizontal channels.

Domain pair transfer is necessary not only because of geometric considerations, it is necessary also to insure that the information is recoverable in case of a power failure as stated hereinbefore. For example, if only one domain of a domain pair is transferred to a horizontal loop during a two-pulse transfer operation, a power failure during the second pulse would leave the second domain of the pair in the vertical loop without directions as to which horizontal loop it is to be associated or (generally) when transfer could next properly occur. There is no easy way to recover from such a failure. On the other hand, if a power failure occurs in an operation where domain pairs are transferred to horizontal loops by a single transfer pulse, recirculation in the vertical loops merely continues until the next proper transfer could occur. It is clearly easier to provide a circuit to determine whether or not a single transfer pulse occurs than to determine whether or not first and second timed pulses properly occur and to correct for failures in the former case.

Transfer from the horizontal loops to the vertical loops is not so hazardous an operation. Whether a single domain is transferred or a pair of domains is transferred by a transfer operation, a failure during transfer is not fatal because recirculation of information in associated loops results in a controlled periodic repositioning of information for proper transfer.

It should be clear then that preferred operating parameters are achieved for straight line sections and a straight transfer conductor and that such geometry dictates a minimum spacing of two domain positions along the vertical loop for each horizontal loop. It should also be clear that optimum access speeds are achieved when domain pairs are transferred simultaneously to horizontal loops and that catastrophic power failures are eliminated in arrangements organized for such pair-transfer operations. In accordance with this invention, two guide elements or two pairs of guide elements effect domain transfer in pairs for each horizontal loop.

An arrangement of the type shown in FIG. 1 for the movement of 0.4 mil diameter domains in 3 Gadolinium (0.78) Terbium (0.22) $Fe_5O_{12}$ garnet by weight requires a pattern of magnetically soft elements with dimensions of 0.2 mil × 1.2 mil × 0.025 mil and a period of 1.6 mils. Adjacent paths of a horizontal loop are spaced at least 1.6 mils apart because of requisite domain spacings (to avoid mutual repulsion). Adjacent horizontal channels are similarly spaced apart. Conductor 16 is 2 mils × 0.025 mil for each operation and currents of 0.050 amps with a pulse width of 20 $\mu$sec duration are adequate. A suitable in-plane field is about 20 oersteds. A bias field of a polarity to constrict domains to the diameter mentioned above is about 60 oersteds.

What has been described is considered only illustrative of the principles of this invention. Therefore, modifications can be devised by those skilled in the art in accordance with those principles within the spirit and scope of this invention.

What is claimed is:

1. Apparatus comprising a layer of magnetic material in which single wall domains can be moved, a pattern of elements having a first period for defining a plurality of first domain propagation loops arranged along a first dimension of said layer, said elements being operative to move domain patterns representative of information bits in said loops in response to a magnetic field reorienting in the plane of said layer, said elements also defining an additional loop arranged along a second dimension of said layer, said additional loop being spaced apart from each of said plurality of loops, an electrical conductor disposed between said plurality of loops and said additional loop and having a geometry for providing a field for displacing domains laterally thereacross when pulsed, and guide elements aligned laterally with respect to said conductor and disposed to insure movement of information bits in pairs from said additional loop to each of said plurality of loops simultaneously when said conductor is pulsed.

2. Apparatus in accordance with claim 1 wherein said elements comprise magnetically soft material adjacent a surface of said layer.

3. Apparatus in accordance with claim 2 wherein said first loops are spaced apart a distance of twice said first period.

4. Apparatus in accordance with claim 3 wherein said guide elements comprise single elements for each of said first loops said elements being spaced apart a distance of said first period.

5. Apparatus in accordance with claim 4 including means for providing said magnetic field reorienting in the plane of said layer and means for pulsing said conductor.

6. Apparatus in accordance with claim 2 wherein said loops arranged along a first dimension are organized in two banks to either side of said additional loop and said conductor is of a geometry to move domains in pairs from the loops of both of said banks to said additional loop simultaneously.

7. Apparatus in accordance with claim 3 wherein said guide elements comprise first and second elements in pairs the elements of adjacent pairs being spaced apart distances of said first period.

8. Apparatus in accordance with claim 7 wherein each of said first and second elements of each of said pairs has a long axis disposed perpendicular to the axis of said conductor, and said second element has a length and occupies a position to displace along the axis of said conductor domains moved laterally across the conductor along associated first elements when said conductor is pulsed.

9. Apparatus in accordance with claim 7 including means for providing said magnetic field reorienting in the plane of said layer and means for pulsing said conductor.

* * * * *